March 18, 1924. 1,487,680
L. J. HIBBARD
SYSTEM OF CONTROL
Filed Dec. 17, 1919 3 Sheets-Sheet 1

Fig. 1.

WITNESSES:

INVENTOR
Lloyd J. Hibbard
BY
ATTORNEY

March 18, 1924.

L. J. HIBBARD

SYSTEM OF CONTROL

Filed Dec. 17, 1919    3 Sheets-Sheet 2

Fig. 2

WITNESSES:

INVENTOR
Lloyd J. Hibbard
BY
ATTORNEY

March 18, 1924.

L. J. HIBBARD

SYSTEM OF CONTROL

Filed Dec. 17, 1919   3 Sheets-Sheet 3

V Governed by Overspeed Drum.

∗ Governed by Relay.

INVENTOR
Lloyd J. Hibbard
BY
ATTORNEY

WITNESSES:

Patented Mar. 18, 1924.

1,487,680

UNITED STATES PATENT OFFICE.

LLOYD J. HIBBARD, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed December 17, 1919. Serial No. 345,486.

*To all whom it may concern:*

Be it known that I, LLOYD J. HIBBARD, a citizen of the United States, and a resident of Wilkinsburg, in the county of Allegheny and State of Pennsylvania, have invented a new and useful Improvement in Systems of Control, of which the following is a specification.

My invention relates to systems of control for dynamo-electric machines, and it has special relation to the control and interlocking of the operation of a plurality of alternating-current commutator motors during both the accelerating and the regenerative periods.

Generally stated, it is the object of my invention to provide an auxiliary governing system for effecting reliable and proper sequential operation of a plurality of switching devices for governing the motoring and the regenerating operations of a set of single-phase commutator motors.

In a copending application of Laurence M. Perkins, Serial No. 273,082, filed January 25, 1919, and assigned to the Westinghouse Electric & Manufacturing Company, is set forth and claimed certain main-circuit connections, which are illustrated in a simplified manner, for governing a single-phase commutator motor during the regenerative period.

One object of my present invention is to provide a reliable and effective auxiliary governing system for a commercially complete motor-control system embodying the circuit connections that are shown in the above-identified copending application. Consequently, I do not deem it necessary to fully explain the main-circuit connections and the vectorial relations of the various electrical quantities that obtain during the operation of the system, since such explanation is not necessary for a complete understanding of my present invention.

Other specific objects of my invention, relating to the improved interlocking or auxiliary control functions, will become evident from the following detailed description taken in conjunction with the accompanying drawings, wherein.

The general operation of the dynamo-electric machines that are controlled in accordance with my present invention may be set forth as follows. The motors are connected in parallel relation during the accelerating period and the applied voltage from the supply transformer is gradually increased by manipulation of the main master controller. In case of low voltage, the over-speed drum may then be operated to enlarge the transformer section that is connected across the motors.

The main field windings are separately excited during the regenerative period by means of the resultant voltage that is obtained from the secondary winding of the phase converter and a section of the supply transformer. Regeneration is accomplished by varying the phase relation between the armature and the field winding currents in such manner that a component of the armature current is 180° out of phase with the field-winding current. The phase relation of the armature current is automatically controlled through the agency of a power-factor relay device, which maintains the current phase at a predetermined angle to the line voltage. The phase relation of the field current is manually controlled from the main master controller to thereby govern the regenerative tractive effort of the locomotive.

Figures 1, 4, 5, 6:
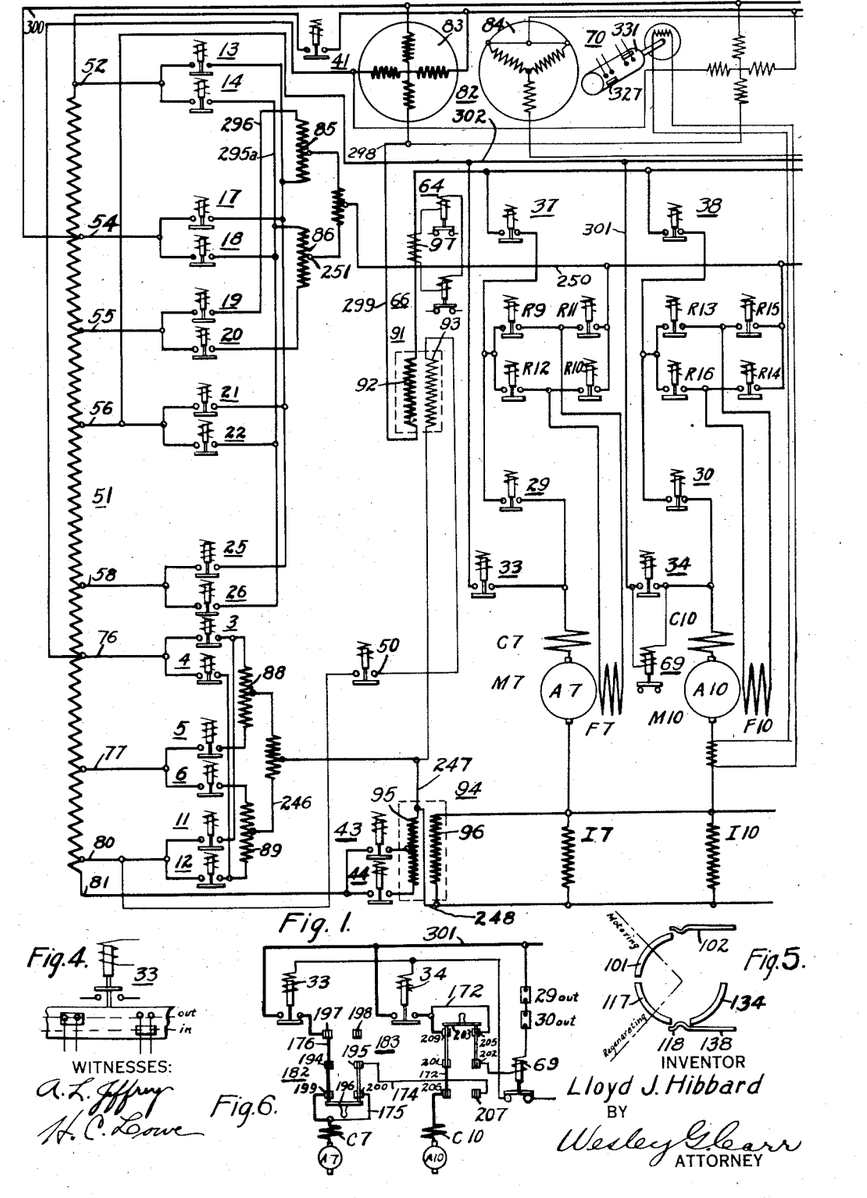
Figure 1 is a diagrammatic view of a substantially complete main-circuit control system organized in accordance with the principles set forth in the above-identified copending application.
Fig. 4 is a diagrammatic detail view of one of the unit switches that is employed in my invention.
Fig. 5 is a semi-diagrammatic view showing the preferred construction of one of the drum controllers that is utilized in the present invention.
Fig. 6 is a diagrammatic view of an interlocking system that is preferably employed in connection with the operation of one portion of my invention.

Referring to Fig. 1 of the drawings, the system here shown comprises a plurality of single-phase motors of the commutator type M7 and M10, which are respectively provided with armatures A7 and A10, main or exciting field windings F7 and F10, compensating or inducing field windings C7 and C10, and interpole or commutating field windings I7 and I10, the motors being selectively connected through switches 3 to 6, inclusive, 11 to 14, inclusive, 17 to 22, inclusive, 25, 26, 29, 30, 33, 34, 37 and 38, and other apparatus through switches 41, 43, 44 and 50 to the secondary winding 51 of a supply transformer of a familiar type.

The system further comprises a plurality of transformer taps 52, 54 to 56, inclusive, and 58, that are associated with the "field power-factor regulating" switches 13, 14, 17 to 22, inclusive, 25 and 26 the corresponding portions of the supply transformer being connected, during the regenerative period of the main motors, in series relation with the secondary or generating phase of the phase-converter that is interposed between the commutating machines and the supply transformer winding to effect regenerative operation of the machines.

Further taps 76, 77, 80 and 81, upon another section of the transformer winding 51, are associated with the "speed-regulating" switches 3 to 6, inclusive, 11 and 12 and serve to connect selected portions of the transformer to the armatures of the commutator machines. The switches 3 to 6, inclusive, 11 and 12 are employed during the motoring period for varying the voltage impressed across the main motors, whereby the speed thereof may be controlled. The switches are also used to vary the voltage applied to the interpole field windings I7 and I10. During the regenerating period, switches 3 to 6, inclusive, 11 and 12 are automatically controlled through the agency of a power-factor relay (designated as 70 in Fig. 2) and a sequence drum (designated as 73 in Fig. 2), whereby the voltage across the motor armature and a "main field auxiliary exciting" transformer 91 is suitably varied to maintain the armature current in a predetermined phase relation with the line voltage, as fully explained in the above-identified Perkins application.

A phase-converter 82 is provided with a stator 83 having quadrature-related motoring and generating windings and a co-operating rotor 84 having a winding that is adapted for direct-current excitation; or, in other words, the phase-converter is preferably of the synchronous type. It is not believed to be necessary to describe or explain the operation of the phase-converter 82 beyond stating that one stator winding thereof is connected across a predetermined section of the transformer winding to operate the converter as a synchronous motor, whereas a quadrature-related stator winding generates a voltage by reason of cutting the flux set up by the direct-current rotor winding, and such generated voltage is employed to assist in exciting the main field windings of the motors during the regenerative period.

For the purpose of preventing undue surges of current while shifting from one transformer tap to another, preventive coils 85 and 86 are associated with the switches 13, 14, 17 to 22, inclusive, 25 and 26 in a familiar manner, while corresponding preventive coils 88 and 89 are connected in circuit with the switches 3 to 6, inclusive, 11 and 12.

The above-mentioned main field auxiliary exciting transformer 91 is provided with a secondary coil 92 which is connected in series relation with the primary winding of the stator 83 of the phase-converter 82. A co-operating or primary winding 93 of the auxiliary transformer 91 is connected between the preventive coils 88 and 89 and transformer tap 80, a normally open switch 50 being interposed in the circuit.

An interpole field transformer 94 is provided with a primary winding 95 that is connected between the preventive coils 88 and 89 and one end-tap 81 of the supply transformer 51, a plurality of switches 43 and 44 serving to connect different portions of the interpole transformer winding 95 in circuit, for a purpose to be hereinafter set forth. The secondary winding 96 of the interpole field transformer is connected in shunt relation to the interpole field windings of the motors, which windings are here shown for the sake of simplicity and convenience as embodying a single coil, such as that marked I7 and I10.

A series or current transformer 97 is connected in the main motor circuit, that is, in series relation with the secondary winding 92 of the main field exciting transformer 91, for the purpose of governing a plurality of relay devices 64 and 66, as subsequently set forth in detail. Furthermore, a balancing relay 69 is continually shunted across the terminals of the switch 34 and is instrumental in connecting the machines to the supply circuit when the relative voltage conditions thereof are proper.

During the motoring period, the switches 19 to 22 are controlled by the "Overspeed" lever of the master controller and are used to provide additional speed notches under low trolley-voltage conditions, when full-speed operation cannot be obtained by means of the principal speed lever or handle.

During the regenerative period, the regulating switches 13, 14, 17—22, inclusive, 25 and 26 are controlled directly by the main speed lever of the master controller and are used to vary the phase relation between the resultant voltage that is applied to the main field windings and the line voltage, which variation, in turn, effects regulation of the regenerated torque of the locomotive.

The switches 29 and 30, are controlled directly by the main speed lever of the master controller and are used to disconnect the main field windings from the armature during the regenerative period, while, during the motoring period, they are closed.

Switches 33 and 34 are employed to connect the motor armatures to the supply circuit during the regenerative period. They are controlled by the main speed lever of the master controller and also by means of a set of contact members upon the voltage balancing relay 69. This relay prevents the switches from closing when more than a predetermined value of voltage obtains across the line switch 34 and hence prevents a current or torque surge when the machines are connected to the line.

Switches 37 and 38 are used to connect the main field windings across the generator winding of the phase-converter and a section of the supply transformer during the regenerative period. These switches are controlled by the main speed lever of the master controller.

Switches 43 and 44 are used to vary the voltage applied to the interpole field windings I7 to I10 of the motors. These switches are automatically controlled by current relays 64 and 66.

A plurality of switches R9 to R16, inclusive, are employed for reversing the main field windings of the motors and are controlled by the reversing lever of the master controller. These switches are closed in alternate pairs to provide the desired connection, as subsequently more fully described.

The main field auxiliary exciting transformer 91, as fully explained in the above-identified Perkins application, is employed to automatically vary the phase relation of the voltage applied to the main field windings in such manner as to change the slope of the speed curves of the motor and afford a greater operating range in accordance with each curve. Consequently, the total number of switches that are required for covering a given range in locomotive speed is materially decreased.

The interpole field transformer 94 is employed in conjunction with the speed-regulating switches 3 to 6, inclusive, 11 and 12, 43 and 44, to vary the voltage impressed upon the interpole field windings I7 and I10 inversely with the speed of the motor and directly with the armature current, whereby desirable commutation in the motors is maintained over a wide range. The switches 3 to 6, inclusive, 11 and 12 operate to decrease the voltage across the primary winding 95 of the interpole field transformer as the switches are manipulated to increase the motor speed, while switches 43 and 44 automatically vary the voltage impressed upon the transformer in accordance with the variations of armature current.

Figure 2:
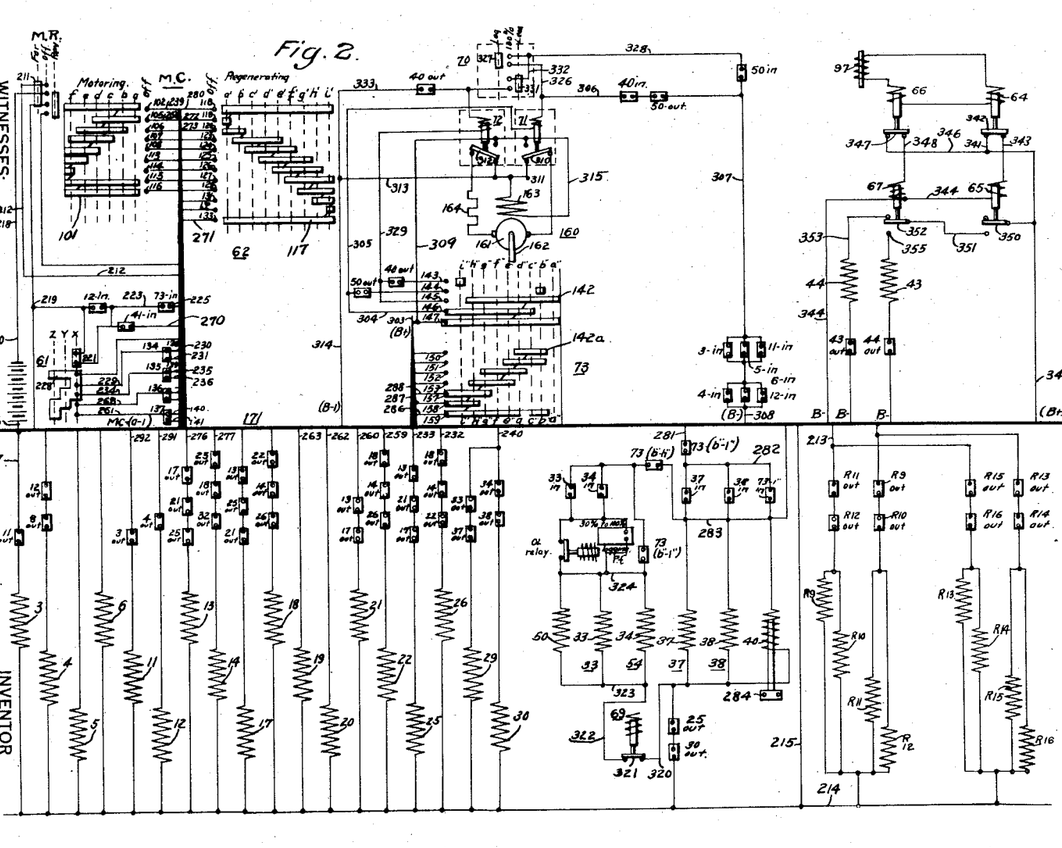
Fig. 2 is a diagrammatic view of my auxiliary governing circuits for the main control system of Fig. 1.

Referring to Fig. 2 of the drawings, the auxiliary governing system shown comprises the actuating coils of the various switches that are shown in Fig. 1, together with a plurality of electrical interlocks of the familiar type that is illustrated in Fig. 4 in connection with the switch 33, and primary controlling apparatus including a control battery B, a master controller main drum MC, a master reverser MR, and an overspeed controller 61. Further control of the auxiliary circuits is effected by means of a plurality of relay devices, already mentioned in connection with Fig. 1, and also through the agency of the sequence drum 73, which is driven by a pilot motor that is controlled by the power-factor relay 70.

The master controller MC is provided with seven operative positions $a$ to $g$, inclusive, corresponding to motoring or acceleration, these positions being located on one side of an "off" or neutral position, while, for regeneration, nine operative positions $a'$ to $i'$ are arranged on the opposite side of the "off" position. A suitably configured contact segment 101 is placed on the motoring side of the controller for the purpose of engaging a plurality of control fingers 102, 105 to 108, inclusive, 113 to 116, inclusive, in a predetermined sequence. In a similar manner, a contact segment 117 is provided upon the regenerative side of the master controller to engage a plurality of control fingers 118 to 120, inclusive, 123 to 128, inclusive, and 131 to 133, inclusive.

In addition, a plurality of overspeed contact segments 134 to 137 are provided upon the master controller and are respectively associated with pairs of control fingers 138, 139, 140 and 141. The preferred construction of the master controller to provide the desired connections is indicated in Fig. 5, whereby it will be seen that the motoring contact segment 101 and the overspeed contact segment 134 are located opposite each other on the control drum, while the regenerative control fingers 118 and the overspeed control fingers 138 are disposed in substantially the same plane. The purpose of this construction will become evident from the following detailed description.

The overspeed drum 61 normally occupies position $x$, as illustrated, and is adapted to be actuated through positions $y$ and $z$, for purposes hereinafter described in detail.

The sequence drum 73 normally occupies a position $i''$ and is adapted to occupy other operative positions $h''$ to $a''$, inclusive. A contact segment 142 selectively engages a plurality of control fingers 143 to 147, inclusive, while other control fingers 150 to 153, inclusive, and 157 to 159, inclusive, engage a contact segment 142a in a predetermined order.

The sequence drum 73 is driven by a pilot motor 160 having an exciting field winding 163 and a commutator-type armature 161 that is mechanically connected to the operating shaft 162 of the drum and that may be energized in conjunction with a braking resistor 164 through the agency of a plurality of reversing relay devices 71 and 72 for governing the starting, stopping and direction of movement of the pilot motor. The power-factor relay device 70, in turn, governs the operation of the relays 71 and 72 and is provided with three positions marked Lag, 100%, and Lead, corresponding to the value of the power factor that obtains during the operation of the main motors.

As illustrated in the above-identified Perkins application, the power-factor relay 70 is actuated by means of a motor having a two-phase stator winding that is connected to the two-phase stator winding of the phase-converter, while the rotor winding of the auxiliary motor is energized in accordance with the current traversing the main motor armature. Since the connections of the auxiliary driving motor form no part of my present invention, I have not deemed it necessary to illustrate or specifically explain such connections, it being understood that the power-factor relay device 70 is automatically actuated in accordance with the power-factor of the main motor system to maintain a predetermined value of power-factor, preferably 100%, through the agency of the reversing relay devices 71 and 72 and the sequence drum 73.

More specifically described, notches $b''$ to $h''$, inclusive, control switches 3 to 6, inclusive, 11 and 12, during the regenerative period. The normal notch $i''$ is provided to ensure that the switches 37 and 38, and 11 and 12 are closed to energize the voltage-balancing relay 69 before the line switches 33 and 34 have an opportunity to close. Consequently, the last-named switches cannot be closed before the voltage of the main armature has been adjusted to a proper value.

Notch $a''$ is provided to effect an opening of the main-circuit switches in case the motorman throws the main speed lever to balancing position $a'$ of the master controller and attempts to effect regeneration when the locomotive is running at a speed that is too low.

The sequence drum 73 is automatically returned to the illustrated position $i''$, whenever switches 37 and 38 are opened, by reason of the energization of the pilot motor 160 that thereupon occurs. This feature is provided to ensure the proper functioning of the voltage-balancing relay 69 at all times.

The sequence drum 73 is automatically moved notch by notch from position $i''$ toward position $a''$, when the motorman throws the main speed lever to balancing position $a'$ of the master controller. Such movement continues until the proper voltage, as indicated by the voltage-balancing relay 69, has been attained. In this event, the regenerative line switches 33 and 34, inclusive, are closed to connect the motors to the supply circuit. When these switches have been closed, the sequence drum is directly controlled by the power-factor relay 70 and is moved back and forth notch by notch as the locomotive speed varies or as the main speed lever of the master controller is actuated.

The pilot motor 160 is controlled by means of the reversing relay devices 71 and 72 as follows. Whenever both of the relay devices are energized or both are deenergized, the motor armature is short-circuited through the resistor 164 and is dynamically braked if it is running at the time. When the relay device 71 is deenergized and the relay device 72 is concurrently energized, the motor armature is actuated to rotate the sequence drum from position $a''$ toward position $i''$, whereas, with the reverse conditions of the relay devices, the sequence drum is moved in the opposite direction.

The operating coil of relay device 40 is connected in parallel relation to the operating coils of switches 37 and 38. The relay device is employed for completing the control circuits to the power-factor sequence drum 73 when the regenerative line switches 33 and 34 are open, as hereinafter more fully set forth and the operation of the relay device is not effected by cutting out a set of motors.

The interpole limit switches or current relays 64 and 66 are energized from the series transformer 97 and are adapted to govern the energization of transfer relay devices 65 and 67, respectively, whereby the actuating coils of the switches 43 and 44 are energized and deenergized to correspondingly vary the energization of the interpole field windings I7 and I10, from the interpole field transformer 94.

The operating coil of the limit relay 64 is set to effect the lifting of the relay device at a current value equal to approximately two-thirds of the combined hour rating of the motors, while the operating coil of the other limit relay 66 is set to operate the relay device at a current value substantially equal to the full combined hour rating of the motors. Consequently, when the main-armature current equals the critical operating value of the limit switch 64, the switch 44 is closed to energize the primary winding 95 of the interpole field transformer 94 and thus impress an additional voltage upon the interpole field windings I7 and I10, the entire primary winding 95 being connected in circuit. On the other hand, when the limit switch 66 is operated by reason of the traversal of a higher current through the main armatures, the switch 43 is closed, while switch 44 is opened, to exclude a portion of the transformer winding 95 from circuit and thus effect an increased energization of the secondary winding 96 of the interpole field transformer and, therefore, an increased current in the interpole field windings I7 and I10 to compensate for the increased current flow in the main armatures.

The operating coil of the voltage-balancing relay 69 is connected across the terminals of switch 34, as illustrated in Fig. 1. The contact disk of the relay device is placed in the circuit of the actuating coils of switches 33, 34, and 50, as shown in Fig. 2, to prevent these switches from closing when the voltage across the switch 34 exceeds a predetermined value. In this way, connection of the momentum-driven motors to the supply circuit is prevented unless conditions are suitable to preclude a heavy surge of current by connecting the machines to the line. After the switch 34 has once been closed, the voltage relay 69 is de-energized thereby, and the contact disk of the relay device in its lower position acts as a holding circuit for the switches in question.

In the interests of simplicity and economy, the large number of conductors extending from the several controller drums to the auxiliary circuits have been grouped in a conduit or wire bundle, indicated by reference character 171.

Assuming that it is desired to effect forward acceleration of the motors and that the master reverser already occupies its reverse position Rev., the master reverser is first thrown to its position For., whereupon a circuit is established from the positive terminal of the battery B through conductor 210, contact segment 211 of the master reverser, conductors 212 and 213, where the circuit divides, one branch including interlocks R11—out, R12—out, the actuating coils of the switches R9 and R10 in parallel and conductors 214, 215 and 216 to the negative terminal of the battery B. The reversing switches R9 and R10 are thus closed, provided the oppositely connected switches R15 and R16 have been given sufficient time to open.

In a similar manner, the corresponding reversing switches R13 and R14 are closed to connect the rest of the main motors for forward operation.

If the master controller MC is then actuated to its initial motoring position $a$, a new circuit is established from the contact segment 211 of the master reverser in its forward position, through conductor 218, junction-point 219, conductor 220, contact segment 221 in normal position $x$ of the overspeed drum 61, conductors 222 and 223, interlock or contact segment 73—$i''$, whereby the circuit under consideration is closed only when the sequence drum 73 occupies its normal position $i''$, whence circuit is continued through conductors 225 and 226, control fingers 116 and 115, which are bridged by contact segment 101 of the master controller, conductors 227 and 227a, contact segment 228 of the overspeed drum 61, conductor 229, control fingers 138, which are bridged by contact segment 134, from which fingers two parallel circuits extend, one of which includes conductors 230 and 232, interlocks 18—out, 14—out and 22—out and the actuating coil of switch 26 to negative conductor 214, while the other parallel circuit includes conductors 231 and 233, interlocks 13—out, 21—out, 17—out and the actuating coil of the switch 25 to the negative conductor 214.

A further circuit is established from the contact segment 101, in position $a$ of the main master controller MC, through control finger 102, conductors 239 and 240, whence two branch circuits are completed respectively including interlocks 33—out, 37—out, actuating coil of switch 29; and interlocks 34—out and 38—out and actuating coil of switch 30.

Other circuits established at this time extend from the contact segment 101 of the master controller through circuits respectively including control finger 105, whence circuit is completed through conductors 256 and 257, interlock 11—out and the actuating coil of switch 3 to the negative conductor 214.

Figure 3:
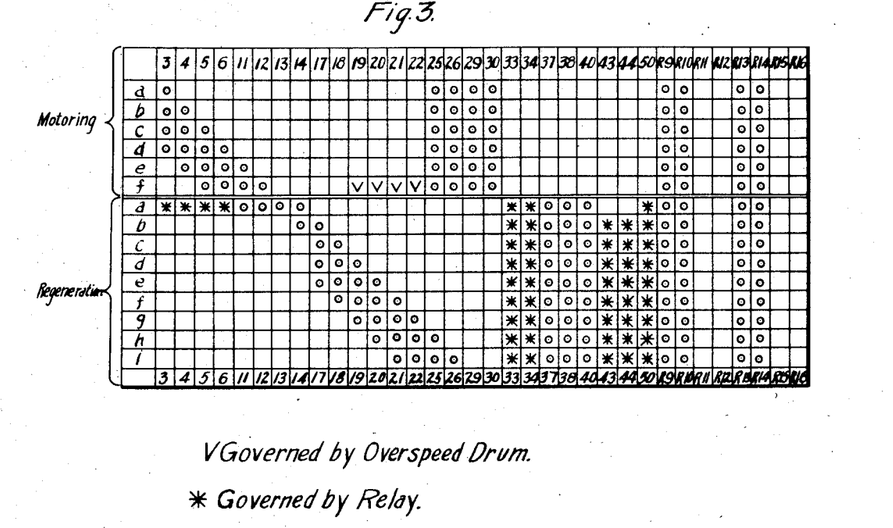
Fig. 3 is a sequence chart, of well-known form, indicating the preferred order of operation of the several switches.

As indicated in step $a$ of the sequence chart, Fig. 3, switches 3, 25, 26, 29 and 30, R9, R10, R13 and R14 are closed under initial motoring conditions of the machines. Referring to Fig. 1, a main circuit is established in this way from intermediate tap 76 of the supply transformer 51, switch 3, a section of the preventive coil 88, conductors 247 and 248, where the circuit divides, one branch including the interpole or commutating field I7, armature A7, inducing field winding C7, switches 29 and R9, exciting field winding F7, switch R10, conductor 250, and thence from a terminal of preventive coil 86 through switches 26 to transformer tap 58.

The remaining car-propelling motor M10 is connected in parallel relation to the motor M7, as will be understood without further tracing the circuit. In this way, the commutator motors have a predetermined starting voltage impressed across their terminals and the locomotive is gradually started into operation.

In a similar manner, control fingers 106 to 108, inclusive, 113 and 114 are successively engaged by the contact segment 101 as the master controller is actuated through notches $b$ to $f$, inclusive, whereby the actuating coils of switches 4 to 6, inclusive, 11 and 12 are respectively energized to gradually increase the voltage across the motor circuits and thus accelerate the motors to full running speed.

During such actuation of the master controller, certain switches drop out in succession, as indicated in the sequence chart, to assist in producing the familiar "stepping-up" of the voltage. The configuration of contact segment 101 primarily governs such release of the switches, while the interlocks in the actuating circuits thereof further insure correct sequential operation, thus preventing short-circuiting of transformer coils.

In case the trolley voltage is low, the overspeed drum 61 may be actuated, after the master controller MC occupies its position $f$, into the second operative position $y$. Although contact segment 221 of the overspeed drum is thus cut out of circuit, the interconnected circuits are not interrupted by reason of the fact that interlock 12—in, actuated by switch 12 in final position $f$ of controller MC, shunts the segment 221. A new circuit is thereupon established from the contact segment 228 of the overspeed drum through conductor 268, contact segment 136, which is bridged by control fingers 140 of the master controller MC, whence circuits are completed through conductors 259 and 260 and the illustrated interlocks to the actuating coils of switches 22 and 21, respectively. At the same time, conductor 229 becomes de-energized by reason of the disengagement of the corresponding control finger from contact segment 228 of the overspeed drum in position $y$, whereupon switches 25 and 26 are opened.

In this way, a higher voltage tap, namely, tap 56, is connected in the motor circuit, while the tap 58 is disconnected therefrom to impress a greater voltage upon the motor terminals and increase the operating speed of the machines.

In case a still higher voltage is necessary to bring the motors to full running speed, the overspeed drum 61 may be actuated to its position $z$ to establish a new circuit from contact segment 228 through conductor 261, contact segment 137, which is bridged by control fingers 141 of the master controller MC, whence circuit is completed through conductors 262 and 263 and the illustrated interlocks to the actuating coils of switches 20 and 19, inclusive.

Consequently, a still larger section of the supply transformer is connected across the terminals of the motor circuits and the motors may thus be accelerated to a higher speed.

Assuming that it is desired to effect regenerative operation of the system with the master reverser MR occupying its Forward position and the overspeed drum 61 occupying its normal position $x$, the master controller MC may be moved to the initial or balancing notch $a'$ on the regenerative side of the controller. Previous to such manipulation, it will be understood that the phase-converter 82 has been started into operation in any suitable manner and that the secondary switch 41 has been closed to render the voltage of the secondary or generator winding of the phase-converter stator 83 available for aiding the excitation of the main field windings, as previously described.

Under these conditions, a circuit is established from the positive terminal of the battery B through the master reverser and the overspeed drum to conductor 222, as previously traced. From this point, a circuit is continued through interlock 41—in, conductors 270 and 271, control finger 133, contact segment 117 of the master controller and control fingers 119 and 120, from which circuits are respectively continued through conductors 272 and 276, interlocks 17—out, 21—out and 25—out, the actuating coil of switch 13 and conductors 273 and 277, proper interlocks and the actuating coil of switch 14.

A further circuit is established from the master controller MC in its balancing position $a'$ through control finger 118, conductors 280 and 281, contact segment 73—($b''$—$i''$) of the sequence drum, conductor 282, contact segment 73—$i''$ (thus insuring that the sequence drum occupies its normal position before regenerative operation can be effected), whence circuit is continued through conductor 283, parallel-related actuating coils of the switches 37, 38 and 40, conductor 284, interlocks 29—out and 30—out and thence through negative conductor 214 to the corresponding battery terminal. Upon the closure of these switches, "holding" circuits therefor are formed between conductors 282 and 283, comprising parallel-related interlocks 37—in and 38—in.

A branch circuit is established from the above-mentioned interlock 73—$i''$ through conductors 285 and 286 to control finger 159 and contact segment 142$a$ of the sequence drum 73. Control fingers 158 and 157 and corresponding conductors 287 and 288 are thereupon energized from the contact segment 142$a$, and circuits are continued therefrom through conductors 291 and 292 and proper interlocks to the actuating coils of switches 12 and 11 respectively.

Referring temporarily to Fig. 1, the main circuit connections at this time comprise outer transformer taps 52, switches 13 and 14, conductors 295 and 295a, preventive coils 85 and 86, conductor 250, switch R10, exciting field winding F7, switch R9, switch 37, conductor 298, primary winding of the current transformer 97, secondary winding 92 of the main field exciting transformer 91, conductor 299, generating winding of the stator 83 of the phase-converter 82 and conductor 300 to intermediate transformer tap 54. A similar circuit, including the switch 38 and the remaining exciting field winding F10 is concurrently energized by reason of the illustrated parallel relation of the field-winding circuits. In this way, the exciting field windings are energized by the resultant voltage of the transformer section extending between taps 52 and 54 and the generated voltage of the secondary winding of the phase-converter stator 83.

The armature circuits are established from transformer tap 80 through switches 11 and 12, and preventive coils 88 and 89 to conductor 247. The circuit is continued through conductor 248, interpole field coil I10, armature A10, inducing field winding C10, actuating coil of the voltage-balancing relay 69, which is connected across the terminals of the open regenerative line switch 34, whence circuit is continued through conductors 301 and 302 to intermediate transformer tap 56. In this way, the voltage of a predetermined section of the supply transformer 51 is opposed to the regenerative voltage of the momentum-driven armature A10, the differential value of these voltages being impressed upon the actuating coil of the voltage-balancing relay 69, which remains in its upper or open-circuit position until these voltages are substantially equal.

The initial or preparatory regenerative voltage is automatically varied, until it substantially equals the voltage of the corresponding section of the supply transformer, by means of the power-factor sequence drum 73. This function is accomplished by reason of the establishment of a circuit from the positive terminal of the battery B through conductor 303, control fingers 147 and 146, which are bridged by contact segment 142 of the sequence drum, conductors 304 and 305, actuating coil of the reversing relay 71, conductor 306, interlocks 40—in and 50—out, conductor 307, series-connected interlocks 11—in and 12—in and conductor 308 to the negative battery terminal.

Upon the relay 71 being actuated to its upper position, by reason of the energizing circuit just traced, a circuit is established from the positively-energized conductor 303 through conductor 309, armature 310 of the reversing relay 71, conductor 311, armature 161 of the pilot motor 160, resistor 164, armature 312 of the reversing relay 72 in its normal or de-energized position, and conductors 313 and 314 to the negative battery terminal.

A further circuit is completed from the conductor 309 through conductor 315 and field winding 163 of the pilot motor to negative conductor 313.

In this way, both the armature and the field windings of the pilot motor 160 are energized in such manner that the power-factor relay drum 73 is gradually actuated toward its position $a''$. By so doing, the control fingers 153 to 150, inclusive, may be successively engaged by the contact segment 142a to energize the conductors leading to the actuating coils of switches 6 to 3, respectively, whereby the section of the supply transformer that is connected to the momentum-driven armatures is gradually decreased until a substantial equality obtains between the voltage of that section and the voltage of the armatures. Under such conditions, the actuating coil of the voltage-balancing relay 69 is substantially de-energized, causing the relay to drop to its lower or circuit-closing position, whereupon a circuit is continued from the conductor 284 through conductor 320, contact disk 321 of the voltage-balancing relay 69 in its lower position, conductors 322 and 323, the parallel-related actuating coils of switches 50, 33 and 34, conductor 324, contact segment 73—($b''$—$i''$) of the power-factor sequence drum, conductor 325, contact segment 73—($b''$—$i''$), conductor 283, parallel-related interlocks 37—in and 38—in, conductor 282 and contact segment 73—($b''$—$i''$) to positively energized conductor 281.

In this way, the regenerative line switches 33 and 34 are closed when proper relative voltage conditions of the momentum-driven armatures and the supply circuit obtain, while the closure of line switch 34 short-circuits the actuating coil of the voltage-balancing relay 69, which subsequently remains in its lower or circuit-closing position to act as a holding circuit for the coils of the line switches.

The switch 50 is also closed at this time to connect the primary winding 93 of the main field exciting transformer 91 across a certain section of the transformer that extends between tap 80 and the adjacent active taps that are connected through the switches 3 to 6, inclusive.

It will be seen that actuation of the master controller to its initial or balancing notch $a'$ first closes the switches for energizing the exciting field windings from the generating winding of the phase-converter and a section of the supply transformer, whereupon the voltage-balancing relay 69 automatically permits the operation of the sequence drum 73 until conditions are suitable for regeneration, whereupon connection of the momentum-driven machines to the line is automatically effected. Such switch movements are indicated in step $a'$ of the sequence chart, Fig. 3.

As soon as the voltage-balancing relay 69 has dropped to its lower position to effect the above-described closure of switch 50, the previously-traced circuit through the actuating coil of the reversing relay 71 and interlock 50—out is interrupted. However, control of the sequence drum 73 is immediately assumed by the power-factor relay 70, since the actuating coil of the switch 71 is connected through conductor 326, contact segment 327 of the power-factor relay in its "lag" position, conductor 328 and interlock 50—in to negative conductor 307.

Consequently, the sequence drum 73 is rotated toward its position $a''$ whenever the power-factor of the regenerating motors tends to fall below the critical value, preferably 100%, for which the power-factor relay has been previously adjusted. On the other hand, in positions $g''$ to $a''$ of the sequence drum, a new circuit may be established from the contact segment 142 through control finger 145, conductor 329, actuating coil of the reversing relay 72, conductor 330, contact segment 331 of the power-factor relay 70 in its "lead" position, and conductor 332 to negative conductor 328. Consequently, the reversing relay 72 is actuated to its upper position, while the relay 71 occupies its normal or lower position whenever the power-factor of the regenerating motors tends to increase beyond the above-mentioned critical value, whereby the connections of the pilot-motor armature 161 are reversed to cause a reverse movement of the drum 73 toward its position $i''$. In this way, the desired power-factor relations are automatically re-established.

As indicated in the sequence chart, positions $b'$ to $i'$, inclusive, the field power-factor regulating switches 14, 17 to 22, inclusive, 25 and 26 are successively closed for certain periods as the master controller MC is actuated through its positions $b'$ to $i'$. In this way, the gradual decrease in speed of the regenerating locomotive during the retardation period may be manually compensated for to maintain a desired value of braking effort. During such manipulation, the power-factor relay 70 automatically maintains the desired power-factor relations by governing the opening and closure of the speed-regulating switches 3 to 6, inclusive, 11 and 12.

When it is desired to discontinue regenerative operation, the master controller MC may be returned to its "off" position to open all the switches governed thereby. Under such conditions, the sequence drum 73 is automatically returned to its initial position $i''$ to insure readiness for the next regenerative operation, through the agency of a circuit that is completed from the actuating coil of the reversing relay 72 through conductor 330, interlock 40—out and conductor 333 to negative conductor 314. The pilot motor 160 is thus automatically energized to effect the return movement of the drum 73 between positions $a''$ and $h''$ or any portion thereof, since control fingers 147 and 145 are continuously engaged in such positions by the contact segment 142. As soon as position $h''$ is passed, the control of the reversing relay 72 is transferred to another portion of the contact segment 142 and control finger 143, whence the circuit in question is completed through interlock 40—out to conductor 329. In this way, the portion of the contact segment 142 that was employed in connection with control finger 145 during normal forward movement of the sequence drum 73 is employed to return the drum as far as position $h''$ and the remaining portion of the backward travel of the drum is effected through the agency of control finger 143 and the corresponding portion of the contact segment 142.

Thus, whenever the switch or relay 40 opens, the power-factor sequence drum 73 is automatically returned to its position $i''$. If the operating handle or lever of the master controller MC is placed or held on the regenerative notches, the power-factor drum will again be automatically rotated step by step from position $i''$ to position $a''$, provided that the locomotive is running at a speed that is too low to effect regeneration. The switches initially closed, including switch 40, will be opened when the drum reaches position $a''$, as previously described. The opening of switch 40 causes the drum to return to position $i''$, as already set forth. This cycle will be repeated as long as the operating handle in question is held on the regenerative notches and thus will act as a signal to the motorman when the locomotive speed is too low for regenerative operation. This action will also serve to warn the motorman if the operating handle is left on a regenerative notch when the locomotive is at a standstill.

An interlock 50—out is connected with control finger 144 which engages contact segment 142 of the sequence drum 73 in position $b''$. The function of this interlock is as follows. In case the motorman attempts to effect regeneration at an unsuitably low speed which has caused the sequence drum 73 to be rotated to its limiting regulating position $b''$ during the preliminary voltage-balancing period before the switch 50 has been closed by the relay 69, then a circuit is established through the interlock 50—out in question and the actuating coil of the reversing relay 71 to energize the pilot motor 160 in such a direction that the sequence drum is rotated to its extreme position $a''$. Consequently, all of the switches governed by the contact segment 142a of the power-factor drum, namely, switches 3 to 6, inclusive, 37, 38 and 40, are thus caused to be opened and any further preparatory regenerative action is prevented.

The control circuits for governing the interpole field-regulating switches 43 and 44 may be traced as follows. Initially, that is to say, under conditions of least excitation of the interpole field winding, a control circuit is established from the positive terminal of the battery B, through conductors 340 and 341, contact disk 342 of the relay device 64, conductor 343, actuating coil of transfer relay 65 and conductor 344, while a branch circuit is continued from conductor 340, through conductor 346, contact disk 347 of the relay 66, conductor 348 and actuating coil of the transfer relay 67, whence a common circuit for the actuating coils of the relay coils 65 and 67 is completed through conductor 349 to the negative battery terminal. Under such conditions, neither of the actuating coils of the switches 43 and 44 is energized.

However, in case the critical value for which the relay 64 is set, namely, approximately two-thirds of the combined hour rating of the motors is reached, then the relay 64 is actuated to its upper or circuit-opening position to permit the transfer relay 65 to drop to its lower or de-energized position. Consequently, a new circuit is established from the positively-energized conductor 340 through contact disk 350 of the transfer relay 65, conductor 351, contact disk 352 of the other transfer relay in its upper or energized position, conductor 353, actuating coil of the switch 44 and interlock 43—out to the negative battery conductor. Consequently, the entire primary winding 95 of the interpole field transformer 94 is energized to effect the superimposition of a predetermined voltage upon that already impressed upon the interpole field windings I7 and I10.

In case the higher current value for which the relay 66 is set is attained, the relay is likewise actuated to its upper or circuit-opening position, and the consequent dropping of the transfer relay 67 first de-energizes the circuit of the actuating coil of the switch 44 and closes a new circuit as soon as that switch has opened through contact disks 352 of the transfer relay 67, conductor 355, actuating coil of the switch 43 and interlock 44—out to the negative battery conductor. Consequently, the switch 44 is opened and the switch 43 is closed to impress a still higher shunt voltage from the interpole field transformer 94 upon the interpole field winding.

Referring to Fig. 6, the circuit connections there shown are for four sets of motors representing the commercial form of the invention. The connections are provided to insure that the voltage-balancing relay 69 will not be made inoperative whenever any set of motors is cut out of circuit. In general, the system includes a combination of double-throw knife-blade switches for governing both the main and the auxiliary circuits in such manner that the actuating coil of the voltage-balancing relay 69 is transferred from connection across the terminals of one regenerative line switch if the corresponding set of motors is cut out of circuit to another regenerative line switch that is associated with an active set of motors.

The portion of the system illustrated comprises armatures A7 and A10 together with the corresponding inducing field windings C7 and C10, the regenerative line switches 33 and 34, the voltage-balancing relay 69, and a plurality of double-pole double-throw knife switches 182 and 183.

Under normal conditions, that is, when all of the motors are to be connected in circuit, the switch 183 is thrown to its upper position, while the remaining knife-blade switch 182 occupies its lower position, as illustrated. Consequently, a circuit may be established from the conductor 301, which is connected to one terminal of the regenerative line switch 34, through interlocks 29—out and 30—out, actuating coil of the voltage-balancing relay 69, whence circuit is continued through switch jaws 202 and 205, which are bridged by the movable switch element or set of knife-blades 203, and conductor 172 to the opposite terminal of the regenerative line switch 34.

The voltage-balancing relay 69 is thus adapted to perform its previously-described function, being connected across the stationary terminals of the switch 34, as also illustrated in Fig. 1. The armature A10 and the inducing field winding C10 are connected to switch jaw 206, whence circuit is continued through conductor 173, switch jaw 201, one part of the movable switch member 203 and the switch jaw 209 to the regenerative line switch 34, whereby the motor in question may be actively connected in circuit upon the closure of the switch 34.

However, if it is found necessary to cut out of circuit the motor M10, then the voltage-balancing relay must be energized from another regenerative line switch in order to be enabled to perform its functions. Such transfer of connections is automatically effected by throwing the cutout switch 183 to its lower or cutout position. The circuit of the armature A10 is thus interrupted at switch jaw 201, but the circuit of the voltage-balancing relay coil is continued from switch jaw 202 through movable switch member 203, switch jaw 207, conductor 174, switch jaws 195 and 200, which are bridged by movable switch member 196, conductor 175, switch jaws 199 and 194, which are also bridged by movable switch member 196, conductor 176 and switch jaw 197 to one terminal of regenerative line switch 33. Consequently, the voltage-balancing relay 69 is now connected across the terminals of the switch 33 and the normal functions of the relay will, therefore, be effected as previously described.

If an additional motor is connected in parallel to the motors M7 and M10, the previously unemployed jaw 198 is electrically connected to a central jaw of a double-throw two-blade switch that serves as a cut-out switch of the additional motor.

In this way, the transfer of the voltage-balancing relay 69 to always connect it with an active set of motors requires no extra thought or attention upon the part of the motorman when cutting out motors from circuit, since the usual actuation of the main motor-cutout switches automatically serves to reconnect the voltage-balancing relay to an active circuit.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of regenerative control, the combination with a supply circuit and dynamo-electric machine having an armature and a field winding, of a switch for connecting the machine to the supply circuit and having an actuating coil, a relay device having an actuating coil connected across said switch and a contact member in circuit with the actuating coil of said switch, and automatic means for varying the connection of said armature to said supply circuit to decrease the voltage across the actuating coil of said device.

2. In a system of regenerative control, the combination with a supply circuit and a dynamo-electric machine having an armature and a field winding, of a switch for connecting the machine to the supply circuit, means responsive to the voltage across said switch, when open, for effecting closure of the switch and for completing a holding circuit for said switch after the closure thereof.

3. In a system of regenerative control, the combination with a supply circuit and a dynamo-electric machine having an armature and a field winding, of an electrically-controlled switch for connecting said armature to the supply circuit, and a relay device connected to drop to its lower position when the voltage difference of said armature and said supply circuit is relatively low and having a contact member serving to complete and maintain the actuating circuit of said switch upon such drop of the relay device.

4. In a system of regenerative control, the combination with a supply circuit and a dynamo-electric machine having an armature and a field winding, of a switch for controlling the field-winding circuit, a second switch for connecting said armature to the supply circuit, a relay device having an actuating coil connected across said second switch for governing the closure thereof, and a regulating controller biased towards a certain position to effect the closure of the field-circuit switch and the consequent lifting of said relay device to prevent closure of said second switch until a relatively low voltage obtains across the terminals thereof.

5. In a system of regenerative control, the combination with a supply circuit and a dynamo-electric machine having an armature and a field winding, of a switch for connecting a machine circuit to the supply circuit, and a controller for regulating the voltage of said armature and for automatically effecting the opening of said switch if regeneration is attempted at a relatively low speed.

6. In a system of regenerative control, the combination with a supply circuit and a dynamo-electric machine having an armature and a field winding, of means for connecting a machine circuit to the supply circuit, and a controller for regulating the voltage of said armature, said controller having a position beyond one limiting-voltage position for automatically opening said connecting means under predetermined machine conditions.

7. In a system of control, the combination with a dynamo-electric machine and a controller for normally effecting speed control thereof, of an overspeed controller embodying means for preventing such speed control by said normal controller unless the overspeed controller occupies its initial position, and means substituted for said first means when the normal controller occupies a predetermined position.

8. In a system of control, the combination with a dynamo-electric machine and a plurality of speed-regulating switches therefor, of a controller for normally effecting operation of certain of said switches, an overspeed controller having a contact segment for permitting such operation only when the overspeed controller occupies its normal position, and means responsive to the closure of a certain speed-regulating switch, corresponding to the final position of said normal controller, for shunting said contact segment.

9. In a system of control, the combination with a plurality of translating devices and a plurality of cutout switches respectively associated therewith, of a plurality of controlling switches, a relay device having an actuating coil normally connected through one of said cutout switches across one of said controlling switches, and means for transferring said coil to another cutout and controlling switch when the cutout switch to which it is connected is operated.

10. In a system of control, the combination with a plurality of motors and individual cutout switches therefor, of a plurality of line switches for the respective motors, a relay device for controlling said switches and normally governed by the position of one of them, and means dependent upon the movement of the cutout switch corresponding to that line switch for transferring the government of said relay device to another line switch.

11. In a system of control, the combination with a plurality of translating devices and a plurality of cutout switches respectively associated therewith, of a plurality of controlling switches, a relay device having an actuating coil normally connected through one of said cutout switches across one of said controlling switches and means for transferring said coil to another cutout and controlling switch when the cutout switch to which it is connected is actuated from one to another position.

12. In a system of regenerative control, the combination with a voltage-varying device having a plurality of taps, of a motor having an armature circuit and a field-magnet winding, means for connecting said winding to said device, a plurality of switches for varying the connections of one of the terminals of said armature circuit to said taps, an additional switch for connecting the other terminal of said armature circuit to said device, and automatic means for effecting the operation of said switches to bring the voltage across the terminals of said additional switch to a relatively low value and to effect the closure of said switch.

In testimony whereof, I have hereunto subscribed my name this 5th day of December, 1919.

LLOYD J. HIBBARD.